Figure 1:
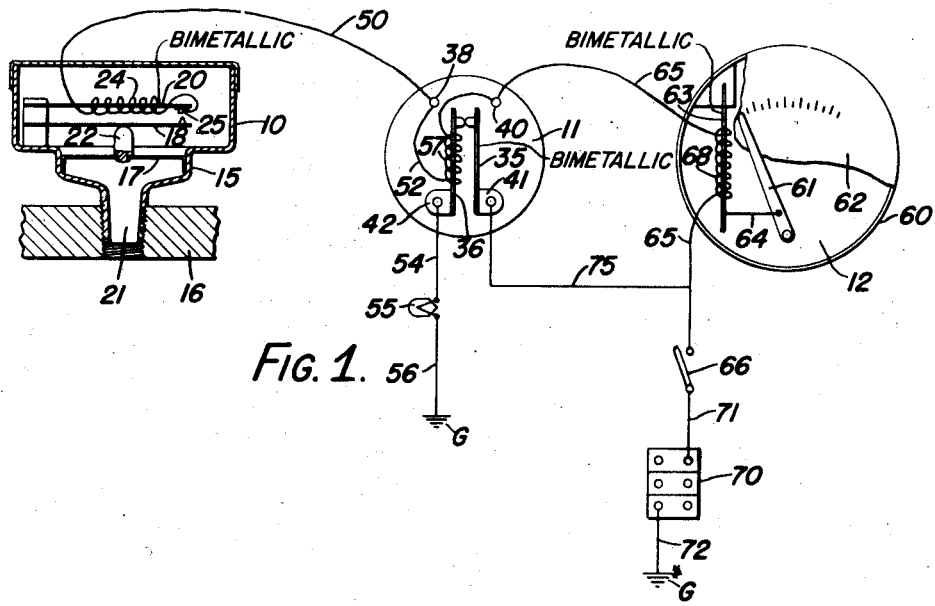

July 29, 1952 — W. B. CONNOLLY — 2,605,339

WARNING SIGNAL SYSTEM

Filed Jan. 21, 1949

INVENTOR.
WILLIAM B. CONNOLLY

BY

ATTORNEY

Patented July 29, 1952

2,605,339

UNITED STATES PATENT OFFICE 2,605,339

WARNING SIGNAL SYSTEM

William B. Connolly, Rochester, N. Y., assignor to Rochester Manufacturing Company, Rochester, N. Y., a corporation of New York Application January 21, 1949, Serial No. 71,978

5 Claims. (Cl. 177—351)

The present invention relates to warning-signal systems and particularly to electrically-operated warning-signal systems such as are employed in automotive installations for warning the vehicle operator that the gasoline supply is nearly exhausted, the oil pressure is low, the water temperature is high, etc. In a more specific aspect the invention relates to a warning signal system for use with impulse-type remote-operated electrically-controlled indicators.

In the usual electrically-operated remote-indication system, there is a condition-responsive sender or transmitter and an electrically-responsive receiver or indicator that is actuated by the sender or transmitter. The sender or transmitter is adapted to respond to variations in gasoline level, oil pressure, water temperature, or whatever condition is to be indicated, and through an electrical connection is adapted to actuate an indicator that may be located, for instance, on the dashboard of the automotive vehicle.

One commonly-used remote-indication system operates with a continuous flow of electric current whose value is changed at the sender, with change in condition, as by varying the resistance in the circuit; and the value of the current is shown by the indicator. In another conventional remote-indication system, the flow of current is not continuous, but intermittent, and a series of momentary current impulses actuate and control the indicator. The time interval and length of these impulses are determined at the sender by the condition being measured.

To obtain a warning signal in an electrically-operated remote-indicating system a switch arm may be added to the transmitter to close a circuit to a warning signal if conditions are dangerous, or a magnetically-operated relay may be interposed in the circuit between the sender and receiver which is responsive to current or voltage changes in the circuit, and which may be connected to actuate the signal when the current or voltage changes beyond set limits. In some cases, also, a separate liquid-level, pressure, or heat-responsive switch, additional to that which operates the indicator, may be installed to operate a warning signal when a dangerous condition exists.

With an impulse-type electrical remote-indicating system, which is the type of system to which the present invention especially relates, the parts are ordinarily too fragile and too delicate to add switch arms. The current impulses, on the other hand, are sometimes as low as six to eight per minute. Hence magnetic relays will not operate.

A primary object of the invention is to provide means that may be employed in conjunction with an impulse-type condition responsive sender to operate a warning signal when a dangerous condition exists.

Another object of the invention is to provide means that may be interposed in an impulse-type electrical remote-indicating system for actuating a warning signal.

Another object of the invention is to provide a warning-signal system and apparatus which may be incorporated as part of a conventional impulse-type electrically-operated remote-indicating system without changing the principle of operation of such a system and without affecting its accuracy.

Further objects of the invention are to provide a warning-signal system and means for actuating the same which can readily be installed in an existing impulse-current remote-indicating system without change in the operation of such a system or in its accuracy.

Other objects of the invention are to provide a warning-signal system with an impulse-type electrically-operated remote-indicator which is simple in construction, easy to install, and of extremely low cost.

Still another object of the invention is to provide a warning-signal system of the type described which is self-correcting for changes in voltage or in ambient temperature.

A still further object of the invention is to provide an improved form of impulse switch or relay for use in a system of the character described which will be reliable, simple in construction and cheap.

Other objects of the invention will be apparent hereinafter from the specification and from the recital of the appended claims.

Figure 2:
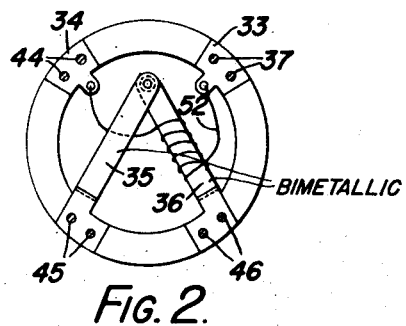
Figure 4:
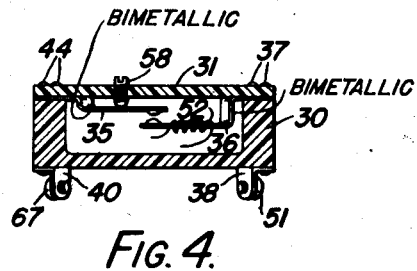
Figure 3:
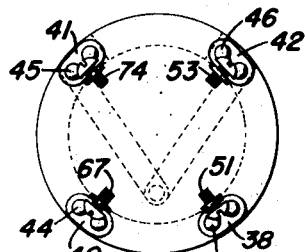

In the drawings:

Fig. 1 is a diagrammatic view illustrating a warning-signal system constructed according to one embodiment of the invention and incorporated as part of an impulse-type remote-indicating system; and Figs. 2, 3 and 4 are a top plan view, a bottom plan view and a transverse sectional view, respectively, of an impulse type relay or switch built according to the present invention for operating the warning signal.

In the system illustrated in the drawings, there are a condition-responsive impulse-type sender or transmitter 10, an impulse-type temperature switch or relay 11, and an impulse-type receiver or indicator 12.

The sender or transmitter may be of conventional construction. It will be constructed to be responsive to the condition that is to be indicated. Thus, it may be made to be responsive to change in liquid-level for gasoline-condition indication, to change in pressure for oil-condition indication, to change in temperature for coolant-condition indication, etc. What is shown is a sender responsive to changes in pressure.

This sender comprises a casing 15, that is threaded into the crank-case 16 of, for instance, an automotive vehicle. The casing houses a flexible diaphragm 17, a grounded switch-arm or contact 18 and a bimetallic arm 20. The diaphragm 17 is subjected to engine oil pressure entering the housing 15 through opening 21. The diaphragm carries a button 22 which engages the underside of grounded contact arm 18. A heater coil 24 is wound around the bimetallic arm 20 and is connected at one end to a contact 25 that is carried by said arm but is insulated therefrom.

The switch or relay 11 may be of conventional structure also but preferably is of the new type disclosed. It comprises a cylindrical casing 30 made of a thermoplastic or other suitable lightweight insulating material, and a cover 31 preferably made of the same material. Mounted in recesses in the upper face of the casing 30 are two plates 33 and 34 and two bimetallic contact members or arms 35 and 36. The plate 33 is secured in place by screws 37 which pass through cap 31 and casing 30 and which thread into a terminal plate 38 that is fastened by the metallic screws against the bottom of the casing. Similarly plate 34 and terminal plate 40, contact arm 35 and terminal plate 41, contact arm 36 and terminal plate 42 are held in the casing by metallic screws 44, 45, and 46, respectively.

The wire 50, to which coil 24 is attached, is connected at one end to terminal plate 38 by screw 51. Terminal plate 38 is connected electrically with plate 33 by the screws 37. A wire 52 is connected at opposite ends with plates 33 and 34, respectively. This wire is formed intermediate its ends into an insulated heating coil 57 that is wound about bimetallic contact member 36. Terminal plate 42, which is electrically connected with contact member 36 through screws 46, is connected by screw 53 and a wire 54 with one terminal of a signal lamp 55. The other terminal of this lamp is connected by a wire 56 with the ground G. The gap between contact members 35 and 36 can be adjusted by screw 58 which threads into the top 31 of casing 30 and engages contact member 35.

The indicator or receiver 12 may be of conventional or any suitable type. It comprises a casing 60, a pointer or indicating needle 61, and a graduated dial 62. Pointer 61 is adapted to be actuated by leverage comprising a bimetallic arm 63, that is mounted at one end in the casing 60 and that is connected adjacent its opposite end with one end of a link 64 which is pivotally connected at its opposite end to pointer 61.

An insulated wire 65 connects one end of a switch 66, such as the ignition switch of the automotive vehicle, with the terminal plate 40 of relay 11, screw 67 serving to make the last-named connection. The wire 65 connects to a heating coil 68 that is wound around bimetallic lever arm 63. The ignition switch is connected with the battery 70 of the vehicle by a wire 71. The battery is in turn connected to the ground G by a wire 72. Terminal plate 41 of relay 11 is connected by screw 74 with a wire 75 which is connected to wire 65.

With the arrangement illustrated, the system becomes operative when the ignition switch 66 is closed.

The pressure of the oil on the diaphragm 17 causes the contact member 18 to be moved upwardly into contact with insulated contact 25. The greater the oil pressure, the greater the pressure of button 22 on contact member 18 and the more the bimetallic arm 20 will be bent.

The contact of parts 18 and 25 establishes a circuit from ground through contacts 18 and 25, wires 50, 52 and 65, switch 66, wire 71, battery 70, and wire 72 back to ground. This circuit will cause the several coils 24, 57 and 68 to be heated.

As coil 24 heats up, bimetallic arm 20 will bend away from contact arm 18 to carry contact 25 away from that arm. When the oil pressure in the crank-case of the vehicle is high, the bimetallic arm 20 will already be bent considerably by the pressure of the oil exerted through button 22 and contact arm 18. With this condition, then, a greater amount of current will be required to bend the arm 20 sufficiently to break contact between contact 25 and contact member 18, than when the oil pressure is low. Moreover, contact is broken for only short periods because on slight cooling of arm 20 contact 25 makes again.

With oil pressure high, then, the circuit is maintained for relatively long periods and breaks of contact are relatively short. Under this condition, the breaks in the circuit to the heater coils 57 and 68 will be so short and so infrequent that these coils will not have much opportunity to cool off.

As bimetallic lever arm 63 is heated up it bends; and the more it is heated, the more it bends. Thus, with high oil pressure, pointer 61 is pushed over to record high pressure on dial 62. The makes and breaks in the circuit to coil 68 are so quick that the movement of pointer 61 will be so minute as not to be detectable.

As contact arm 36 heats up it too bends; and the more it is heated, the more it bends. The impulse switch or relay 11 can be made either of the circuit-opening or the circuit-closing type. In the arrangement shown in Fig. 1, the impulse switch or relay 11 is designed so that when the contact arm 36 is heated up it breaks contact with the arm 35. Hence, when the oil pressure is high, the makes and breaks in the circuit to coil 57 are so short and so infrequent that arm 36 does not have a chance to cool off enough to make the circuit to lamp 55. Hence the lamp does not light as long as the oil pressure is satisfactory.

As the oil pressure drops down, the pressure on contact arm 18 is reduced; and bimetallic arm 20 is bent less mechanically. Less heat in coil 24 is required, then, to break contact and the coil has to cool more, after a break, before contact is remade. The circuit to coils 68 and 57 is therefore more frequently broken and for longer intervals. Coil 68 does not heat up as much between breaks, as when the oil pressure is high. Consequently pointer 61 is not moved as far to the right.

When the oil pressure reaches a dangerous low, which may be predetermined, breaks in the circuit will be for such relatively long intervals that pointer 61 will swing far over to the left to indicate the danger point; and coil 57 will cool off enough to allow contact 36 to engage contact 35 and complete the circuit from ground through wire 72, battery 70, wire 71, ignition switch 66, wire 75, contacts 35 and 36, wire 54, light 55, and wire 56 back to ground. Thus the light 55 will be illuminated to warn of the dangerous condition. Fig. 1 shows relay 11 in circuit-closing position, causing light 55 to be illuminated.

By making the relay or switch circuit-opening, the signal light might be illuminated until a dangerous condition is reached and then be shut off. Obviously instead of a light, a bell, or buzzer or any other suitable signaling device may be employed. Obviously, also, the signal circuit may be employed in conjunction with an impulse sender operated by liquid level, or temperature, or any other condition.

One feature of the relay or switch 11 is that it is self-compensating for ambient temperature. This is because contact arm 35 is bimetallic as well as contact arm 36, and is of substantially the same size and heat characteristics as arm 36. Hence, rise or fall of surrounding temperature works equally on both parts 35 and 36. This same ambient correction can also be effected by use of a single bimetallic element bent to U-shape as well known in the art.

Corrections for voltage variations are inherent with conventional impulse type senders. Hence, the addition into the circuit of a relatively low resistance impulse-type thermal switch 11 does not affect system accuracy.

In the preferred set-up, the coil 57 of relay or switch 11 will be constructed to produce only about nine ohms resistance. With conventional impulse senders and receivers of the type illustrated in Fig. 1, the heating coils 24 and 63 have about ten ohms resistance each. Hence, the resistance in coil 57 is only about one-third of the total electrical resistance of the complete impulse circuit. The thermal element 36 of the relay is of approximately the same size and dimensions as the thermal element 20 of the sender. With this construction switch 11 can be introduced into the remote-indicating circuit without interfering with the accuracy of that circuit.

To those familiar with the art, it will be obvious that by winding a few turns of wire from line 54 around bimetallic element 35, "flasher" signals may be obtained. Also by adjusting the load at contact 36, "flasher" signals may be obtained without winding any coils about bimetallic element 35.

Moreover, while the invention has been described in connection with a particular embodiment thereof and a particular use therefor, it is capable of various modifications and uses; and this application is intended to cover any variations, uses or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In combination, an electrical condition-responsive sender comprising a thermally-responsive element, and an electrical coil for heating said element, an indicator comprising indicating means, a thermally-responsive element for actuating said indicating means, and an electrical coil for heating said second thermally-responsive element, a source of electrical power, a signalling device, and a switch in circuit for connecting said signalling device to said source of power, comprising a third thermally-responsive element, and an electrical coil for heating said third thermally-responsive element, said three coils being in series and connected on one side to said source of power, and means for closing a second circuit from said source of power to said first-named electrical coil and through said first-named coil to the other two coils to energize said three coils simultaneously comprising a condition-responsive movable switch member, and a condition-responsive member for actuating said last-named switch member.

2. A warning signal system comprising a signaling device, a source of electrical energy, a switch for connecting said signaling device in circuit to said source of energy to actuate said signaling device comprising a pair of cooperating electrical contacts, one of which is connected to said source of energy, a bimetallic member on which the other of said pair of contacts is carried, and an electrical heating element associated with and influencing said bimetallic member, an indicator, comprising indicating means, a bimetallic member for actuating said indicating means, and an electrical heating element associated with and influencing the second-named bimetallic member, a third bimetallic member, a third electrical heating element associated with and influencing said third bimetallic member, an electrical contact carried by said third bimetallic member and to which said third heating element is electrically connected, said three electrical heating elements being in series, and means for connecting said three electrical heating elements in a separate circuit to said source of energy to energize said three electrical heating elements simultaneously comprising a movable condition-responsive member, and an electrical contact carried by said member to engage the last-named electrical contact to establish said separate circuit.

3. A warning signal system comprising a signaling device, a source of electrical energy, a switch for connecting said signaling device in circuit to said source of energy to actuate said signaling device comprising a pair of cooperating electrical contacts, one of which is connected to said source of energy, a bimetallic member on which the other of said pair of contacts is carried, and an electrical heating element associated with and influencing said bimetalic member, and means for connecting said heating element in a separate circuit to said source of energy comprising a second bimetallic member, a second electrical heating element associated with and influencing said second bimetallic member, said second heating element being in series with the first-named heating element, an electrical contact carrier by said second bimetallic member and to which said second heating element is electrically connected, an electrical contact cooperating with the third-named electrical contact, and a condition-responsive member for moving said fourth-named electrical contact into and out of engagement with said third-named electrical contact, said third and fourth contacts when engaged closing said separate circuit to both said heating elements to energize both simultaneously.

4. A warning signal system comprising a signaling device, a source of electrical energy, a switch for connecting said signaling device in circuit to said source of energy to actuate said signaling device comprising a pair of cooperating electrical contacts, one of which is connected to said source of energy, a flexible bimetallic arm on which the other of said pair of contacts is carried, and an electrical heating coil wound around said arm, an indicator comprising indicating means, a second flexible bimetallic arm connected to said indicating means to actuate the same, a second electrical heating coil in series with said first heating coil and wound around said arm, and a switch for closing a second circuit from said source of energy to said two heating coils comprising a third bimetallic arm, a pair of cooperating electrical contacts, one of which is carried by said third bimetallic arm, a movable condition-responsive member on which the other of said last-named pair of contacts is mounted, and a third electrical heating coil, said third electrical heating coil being connected electrically to the contact that is carried by said third bimetallic arm, and said third electrical heating coil being in series with the first and second electrical heating coils, whereby when said second electrical circuit is closed by engagement of said last-named pair of contacts all of said heating coils are simultaneously energized, said first electrical heating coil having not more than one-third of the total resistance of said second circuit.

5. A warning signal system comprising a signaling device, a source of electrical energy, a switch for connecting said signaling device in circuit to said source of energy to actuate said signaling device comprising a pair of cooperating electrical contacts, one of which is connected to said source of energy, a flexible bimetallic arm on which the other of said pair of contacts is carried, and an electrical heating coil wound around said arm, an indicator comprising indicating means, a second flexible bimetallic arm connected to said indicating means to actuate the same, a second electrical heating coil in series with said first heating coil and wound around said second arm, and a switch for closing a second circuit from said source of energy to said two heating coils comprising a third bimetallic arm, a pair of cooperating electrical contacts, one of which is carried by said third bimetallic arm, a movable condition-responsive member on which the other of said last-named pair of contacts is mounted, and a third electrical heating coil, said third electrical heating coil being connected electrically to the contact that is carried by said third bimetallic arm, and said third electrical heating coil being in series with the first and second electrical heating coils, whereby when said second electrical circuit is closed by engagement of said last-named pair of contacts all of said heating coils are simultaneously energized, said first electrical heating coil having not more than one-third of the total resistance of said second circuit, and said first and third bimetallic arms being of approximately the same size and dimension and having approximately the same thermal characteristics.

WILLIAM B. CONNOLLY.

REFERENCES CITED

The following references are of record in the file of this patent:

UNITED STATES PATENTS

| Number | Name | Date |
|---|---|---|
| 880,272 | Bristol | Feb. 25, 1908 |
| 1,096,470 | Stern | May 12, 1914 |
| 1,875,625 | Ludwig | Sept. 6, 1932 |
| 1,880,743 | Botts | Oct. 4, 1932 |
| 1,885,051 | Smulski | Oct. 25, 1932 |
| 2,362,021 | Nazar | Nov. 7, 1944 |
| 2,407,810 | Boddy | Sept. 17, 1946 |
| 2,435,181 | Lindsay | Jan. 27, 1948 |